(12) United States Patent
Shi et al.

(10) Patent No.: US 10,084,205 B2
(45) Date of Patent: Sep. 25, 2018

(54) ELECTROLYTE OF HIGH-VOLTAGE LITHIUM-ION BATTERY AND HIGH-VOLTAGE LITHIUM-ION BATTERY

(71) Applicant: SHENZHEN CAPCHEM TECHNOLOGY CO., LTD., Shenzhen, Guangdong (CN)

(72) Inventors: Qiao Shi, Guangdong (CN); Muchong Lin, Guangdong (CN); Dixiong Zhou, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 175 days.

(21) Appl. No.: 15/037,699

(22) PCT Filed: Oct. 22, 2014

(86) PCT No.: PCT/CN2014/089135
§ 371 (c)(1),
(2) Date: May 19, 2016

(87) PCT Pub. No.: WO2016/049953
PCT Pub. Date: Apr. 7, 2016

(65) Prior Publication Data
US 2016/0301104 A1    Oct. 13, 2016

(30) Foreign Application Priority Data

Sep. 29, 2014 (CN) .......................... 2014 1 0513888

(51) Int. Cl.
| | |
|---|---|
| *H01M 10/056* | (2010.01) |
| *H01M 10/0567* | (2010.01) |
| *H01M 10/0525* | (2010.01) |
| *H01M 4/505* | (2010.01) |
| *H01M 4/525* | (2010.01) |
| *H01M 4/02* | (2006.01) |

(52) U.S. Cl.
CPC ....... *H01M 10/0567* (2013.01); *H01M 4/505* (2013.01); *H01M 4/525* (2013.01); *H01M 10/0525* (2013.01); *H01M 2004/028* (2013.01); *H01M 2300/0034* (2013.01); *H01M 2300/0042* (2013.01)

(58) Field of Classification Search
CPC .................................................... H01M 10/56
See application file for complete search history.

(56) References Cited

U.S. PATENT DOCUMENTS

| | | | |
|---|---|---|---|
| 2006/0228625 A1* | 10/2006 | Kawashima | ........ H01M 4/1395 429/200 |
| 2013/0330610 A1* | 12/2013 | Shigematsu | ...... H01M 10/0567 429/200 |

FOREIGN PATENT DOCUMENTS

| | | |
|---|---|---|
| CN | 102637894 A | 8/2012 |
| CN | 103000944 A | 3/2013 |
| CN | 104067433 A | 9/2014 |

OTHER PUBLICATIONS

International Search Report of PCT Patent Application No. PCT/CN2014/089135 dated Feb. 4, 2015.
1st Office Action of counterpart Chinese Patent Application No. 201410513888.9 dated Jan. 28, 2016.

* cited by examiner

*Primary Examiner* — Jacob B Marks

(57) ABSTRACT

The present invention relates to electrolyte of a high-voltage lithium-ion battery, comprising a non-aqueous organic solvent, lithium salt and an electrolyte additive; the electrolyte additive comprises the following ingredients based on the total weight of the electrolyte: 1%-10% of fluoroethylene carbonate, 1%-5% of dinitrile compound and 0.1%-2% of 2-methyl maleic anhydride; further, the electrolyte can be further added with additives such as 0.2%-2% of lithium bisoxalatoborate and 1,3-propane sultone. The present invention also relates to a high-voltage lithium-ion battery using the electrolyte, with the charging cut-off voltage being greater than 4.2V and smaller than or equal to 4.5V. The electrolyte of the high-voltage lithium-ion battery provided by the present invention can protect the positive electrode and also form good SEI at the negative electrode, and the high-voltage lithium-ion battery has good cycle performance and storage performance.

9 Claims, No Drawings

ELECTROLYTE OF HIGH-VOLTAGE LITHIUM-ION BATTERY AND HIGH-VOLTAGE LITHIUM-ION BATTERY

TECHNICAL FIELD

The present invention relates to electrolytes and a battery using electrolytes, in particular to an electrolyte of a high-voltage lithium-ion battery and the high-voltage lithium-ion battery, with the charging cut-off voltage of the high-voltage lithium-ion battery being greater than 4.2V and smaller than or equal to 4.5V.

DESCRIPTION OF THE RELATED ART

Compared with other batteries, lithium-ion batteries have the advantages of small mass, small volume, high working voltage, high energy density, large output power, high charging efficiency, no memory effect and long cycling life; they are not only widely applied in digital product fields such as mobile phones and notebooks, but also regarded as one of the best choices of electromobiles and large energy-storing devices. At present, digital products such as smart mobile phones and tablet products impose higher and higher requirements for the energy density of the batteries, so it is difficult for commercial lithium-ion batteries to meet such requirements. Using high-capacity positive electrode materials or high-voltage positive electrode materials is the most effective means to enhance the energy density of the lithium batteries.

However, in a high-voltage battery, the oxidative decomposition is aggravated when the charging voltage of the positive electrode material is improved, thus resulting in deterioration of the battery performance. Besides, the metal ions of the positive electrode are usually dissolved when the high-voltage battery is used. In particular, the dissolution of the metal ions of the positive electrode is further intensified after the battery is stored at a high temperature for a long time, resulting in a lowering of the retained capacity of the battery. Existing high-voltage lithium cobalt oxide batteries with a voltage of over 4.3V that are available on the market usually have problems of poor high-temperature cycling and high-temperature storage performance, which are mainly reflected in the occurrence of large thickness swelling and large increase in the inner resistance after recycling at a high temperature, and low capacity retention after storage at a high temperature for a long time. Factors causing those problems mainly include: (1) Oxidative decomposition of the electrolyte: At a high voltage, the active materials of the positive electrode have oxidation activities, so the reaction thereof with the electrolyte increases. Furthermore, at a high temperature, the reaction between the high-voltage positive electrode and electrolytes is further intensified, resulting in the oxidative decomposition product of the electrolyte being continuously deposited on the surface of the positive electrode, which deteriorates the surface characteristics of the positive electrode and causes a continuous increase in the inner resistance and thickness of the battery. (2) Dissolution and reduction of metal ions of the active substances of the positive electrode: On the one hand, the LiPF6 in the electrolyte greatly tends to decompose at a high temperature to generate HF and PF5. Wherein, HF will corrode the positive electrode and cause dissolution of the metal ions, thus damaging the structure of the positive electrode material and resulting in loss in capacity. On the other hand, the electrolyte is easily oxidized at the positive electrode at a high voltage such that the metal ions of the active substances of the positive electrode are reduced to dissolve in the electrolytes, thus damaging the structure of the positive electrode material and resulting in loss in capacity. Meanwhile, the metal ions dissolved in the electrolyte easily pass through the SEI, reach the negative electrode and obtain electrons to be reduced to a metal elementary substance, thus damaging the structure of the SEI, and resulting in a continuous increase in the impedance of the negative electrode. The self-discharge of the battery is intensified, and the irreversible capacity is increased, so the performance is deteriorated.

SUMMARY OF THE PRESENT INVENTION

The technical problem to be solved by the present invention is to provide electrolyte of a high-voltage lithium-ion battery which has high stability at a high voltage, excellent high-temperature performance and comprehensive performance, and further provide a high-voltage lithium-ion battery including the electrolyte.

To solve the above mentioned problems, the present invention adopts the following technical solutions.

The electrolyte of a high-voltage lithium-ion battery includes a non-aqueous organic solvent, lithium salt and an electrolyte additive; and the electrolyte additive comprises the following ingredients based on the total weight of the electrolyte: 1%-10% of fluoroethylene carbonate (FEC), 1%-5% of dinitrile compound and 0.1%-2% of 2-methyl maleic anhydride.

The electrolyte of the high-voltage lithium-ion battery in the present invention has the following beneficial effects:

(1) The 1%-10% of fluoroethylene carbonate (FEC) in the additive can form good SEI at the negative electrode, ensuring that the high-voltage battery has good cycling performance.

(2) The 1%-5% of dinitrile compound in the additive can generate a complexing action with metal ions, thus reducing decomposition of the electrolyte, restraining dissolution of the metal ions, protecting the positive electrode and improving the high-temperature performance of the battery.

(3) The 0.1%-2% of 2-methyl maleic anhydride in the additive has a role of forming membranes at the positive and negative electrodes, on the one hand improving the oxidation stability of the electrolytes, and on the other hand forming a membrane at the negative electrode to improve the stability of the SEI, thus improving the cycling and high-temperature performance of the battery.

(4) The electrolyte of the high-voltage lithium-ion battery in the present invention has the beneficial effect of enabling the high-voltage lithium-ion battery to obtain excellent recycling performance and high-temperature performance.

The present invention also provides a high-voltage lithium-ion battery, with a charging cut-off voltage being greater than 4.2V and smaller than or equal to 4.5V, comprising a positive electrode, a negative electrode and a membrane between the positive electrode and the negative electrode, and also comprising the electrolyte of the high-voltage lithium-ion battery.

The high-voltage lithium-ion battery in the present invention has the following beneficial effects:

Adding the optimal combination of the fluoroethylene carbonate, dinitrile compound and 2-methyl maleic anhydride ensures that the high-voltage battery obtains excellent cycling performance, effectively improves the high-temperature storage performance of the high-voltage battery, enhances the capacity retention rate of the battery after storage at a high temperature, and reduces the thickness swelling.

DETAILED DESCRIPTION OF THE PRESENT INVENTION

Electrolyte of a high-voltage lithium-ion battery provided by the present invention includes a non-aqueous organic solvent, lithium salt and an electrolyte additive; and the electrolyte additive comprises the following ingredients based on the total weight of the electrolyte: 1%-10% of fluoroethylene carbonate (FEC), 1%-5% of dinitrile compound and 0.1%-2% of 2-methyl maleic anhydride.

The technical principle of the present invention is as follows: when the content of the fluoroethylene carbonate (FEC) is smaller than 1%, the membrane forming effect is poor at the negative electrode, and the effect of improving the cycling is undesirable; when the content is greater than 10%, the fluoroethylene carbonate tends to dissolve at a high temperature to generate gases, causing serious battery swelling and deteriorating the high-temperature storage performance. When the content of the dinitrile compound is smaller than 1%, the effect of restraining the dissolution of the metal ion is little and the improvement on the high-temperature performance is undesirable; when the content of the dinitrile compound is greater than 5%, the impedance of the positive electrode increases, and the battery performance is deteriorated. When the content of the 2-methyl maleic anhydride is too low, the membrane forming effect at the positive and negative electrodes is poor; when the content is too high, there is an obvious increase in impedance increases, and the battery performance is deteriorated.

The electrolyte of the high-voltage lithium-ion battery in the present invention has the following beneficial effects:

(1) The 1%-10% of fluoroethylene carbonate (FEC) in the additive ensures that the high-voltage battery has good cycling performance.

(2) The 1%-5% of dinitrile compound in the additive can generate the complexing action with metal ions, thus reducing decomposition of the electrolyte, restraining dissolution of the metal ions, protecting the positive electrode and improving the high-temperature performance of the battery.

(3) The 0.1%-2% of 2-methyl maleic anhydride in the additive has a role of forming membranes at the positive and negative electrodes, on the one hand improving the oxidation stability of the electrolyte, and on the other hand forming the membrane at the negative electrode to improve the stability of the SEI, thus improving the cycling and high-temperature performance of the battery.

(4) The electrolyte of the high-voltage lithium-ion battery in the present invention has the beneficial effect that the high-voltage lithium-ion battery obtains excellent recycling performance and high-temperature performance.

Further, the electrolyte of the high-voltage lithium-ion battery also includes 0.2%-2% of lithium bisoxalatoborate based on the total weight of the electrolyte.

When the content of the lithium bisoxalatoborate is too low, the membrane formation effect is undesirable; when the content is too high, on the one hand, increasing the impedance, on the other hand, promoting the dissolving of the metal ions, and deteriorating the battery performance. The 0.2%-2% of lithium bisoxalatoborate in the electrolyte has a good effect of forming a membrane at the negative electrode, can restrain the reduction of the metal ions at the negative electrode, improving the performance of the battery.

Further, the electrolyte of the high-voltage lithium-ion battery also comprises one or more than two of 1,3-propane sultone, 1,4-butane sultone, 1,3-propylene sultone, ethylene sulfate and propanediol cyclic sulfate.

The 1,3-propane sultone, 1,4-butane sultone, 1,3-propylene sultone, ethylene sulfate and propanediol cyclic sulfate are excellent high-temperature additives. When one or more than two above additives are included, the high-temperature performance of the high-voltage lithium-ion battery can be further improved.

Further, the dinitrile compound is selected from one or more than two of butanedinitrile, glutaronitrile, adiponitrile, pimelonitrile, suberonitrile, azelanitrile and sebaconitrile.

Further, the non-aqueous organic solvent is selected from one or more than two of ethylene carbonate, propylene carbonate, butylene carbonate, dimethyl carbonate, diethyl carbonate, methyl ethyl carbonate and methyl propyl carbonate.

Further, the non-aqueous organic solvent is a compound of ethylene carbonate, diethyl carbonate and methyl ethyl carbonate.

Further, the lithium salt is selected from one or more than two of lithium hexafluorophosphate, lithium perchlorate, lithium tetrafluoroborat, lithium difluoroborate, bistrifluoromethanesulfonimide lithium salt and imidodisulfuryl fluoride lithium salt.

The present invention also provides a high-voltage lithium-ion battery, with a charging cut-off voltage being greater than 4.2V and smaller than or equal to 4.5V, comprising a positive electrode, a negative electrode and a membrane between the positive electrode and the negative electrode, and also comprising the electrolyte of the high-voltage lithium-ion battery.

The high-voltage lithium-ion battery in the present invention has the following beneficial effects: Adding the optimal combination of the fluoroethylene carbonate, dinitrile compound and 2-methyl maleic anhydride ensures that the high-voltage battery obtains excellent cycling performance, effectively improves the high-temperature storage performance of the high-voltage battery, enhances the capacity retention rate of the battery after storage at a high temperature, and reduces the thickness swelling.

Further, the structural formula of the active substances of the positive electrode is: $LiNi_xCo_yMn_zL_{(1-x-y-z)}O_2$, wherein, L is Al, Sr, Mg, Ti, Ca, Zr, Zn, Si or Fe, $0 \le x \le 1$, $0 \le y \le 1$, $0 \le z \le 1$.

Further, the material of the positive electrode is $LiCo_xL_{1-x}O_2$, wherein, L is Al, Sr, Mg, Ti, Ca, Zr, Zn, Si or Fe, $0 < x \le 1$.

Embodiment 1 of the present invention is as follows:

1. The preparation method of the high-voltage lithium-ion battery in this embodiment includes steps of positive electrode preparation, negative electrode preparation, electrolyte preparation, membrane preparation and battery assembling.

The preparation step of the positive electrode is as follows: the active materials of the positive electrode, namely the lithium cobalt oxide, conductive carbon black and the binder, polyvinylidene fluoride, are mixed at a mass ratio of 96.8:2.0:1.2; the mixed materials are dispersed in N-methyl-2-pyrrolidone to obtain the positive electrode slurry; the positive electrode slurry is uniformly applied to two faces of an aluminum foil, over-dried, rolled, dried at vacuum; an aluminum outgoing line is welded by using an ultrasonic welders to obtain a positive electrode board with a thickness of 120-150 μm.

The preparation step of the negative electrode is as follows: graphite, conductive carbon black and the binder, butadiene styrene rubber and carboxymethylcellulose, are mixed at a mass ratio of 96:1:1.2:1.8; the mixed materials are dispersed in de-ionized water to obtain the negative electrode slurry; the positive electrode slurry is uniformly applied to two faces of a copper foil, over-dried, rolled, dried at vacuum; a nickel outgoing line is welded by using an ultrasonic welders to obtain a negative electrode board with a thickness of 120-150 μm.

The preparation step of the electrolyte is as follows: the ethylene carbonate, diethyl carbonate and methyl ethyl carbonate are mixed at a volume ratio of EC:DEC:EMC=1:1:1; the mixed materials are added with 1.0 mol/L of lithium hexafluorophosphate, and then added with 1 wt % of fluoroethylene carbonate (FEC), 1 wt % of butanedinitrile (SN) and 0.1 wt % of 2-methyl maleic anhydride (CA) based on the total weight of the electrolyte.

The preparation step of the membrane is as follows:

a polypropylene-polyethylene-polypropylene three-layer isolating membrane is prepared, with a thickness of 20 μm.

The battery assembling step is as follows: a three-layer isolating membrane with a thickness of 20 μm is disposed between the positive electrode board and the negative electrode board; then the sandwich structure consisting of the positive electrode board, the negative electrode board and the membrane is winded; the winded body is flatted and then placed in a square aluminum casing; the outgoing lines of the positive and negative electrodes are respectively welded at corresponding positions of a cover plate; the cover plate and the metal casing are welded together using a laser welder to obtain battery cell to be filled with the electrolyte; the electrolyte prepared is injected into the battery cell via an injection hole, wherein the volume of the electrolyte shall ensure that the battery cell is full of electrolyte.

Then, conventional formation of the first charge is executed by the following steps of: charging at a constant current and a constant voltage at a rate of 0.05 C for 3 min, charging at a constant current and a constant voltage at a rate of 0.2 C for 5 min, charging at a constant current and a constant voltage at a rate of 0.5 C for 25 min, laying the battery aside for 1 hr, shaping the battery, supplementing the electrolyte, sealing the injection hole, further charging to 4.35V at a constant current and a constant voltage at a rate of 0.2 C, laying the battery aside at room temperature for 24 hr, and discharging to 3.0V at a constant current and a constant voltage at a rate of 0.2 C.

1) Room-temperature cycling performance test: at a temperature of 25° C., the formed battery is charged to 4.35V at a constant current and a constant voltage at a rate of 1 C, and then discharged to 3.0V at constant current and constant voltage at a rate of 1 C. After 500 cycles of charging and discharging, the retention rate of the 500th cyclic capacity, the growth rate of the inner resistance and the thickness swelling rate are calculated. The calculation formula is as follows:

Capacity retention rate of the 500th cycle (%)=(Discharging capacity of the 500th cycle/Discharging capacity of the first cycle)×100%

Thickness swelling rate after the 500th cycle (%)= (Thickness after the 500th cycle-initial thickness before the cycling)/Initial thickness before the cycling)×100%

Growth rate of the inner resistance after the 500th cycle (%)=(Inner resistance of the 500th cycle-initial resistance before the cycling)/Initial resistance before the cycling×100%

2) High-temperature storage performance: the formed battery is charged to 4.35V at a constant current and a constant voltage at a rate of 1 C at room temperature; the initial thickness and initial discharging capacity of the battery is measured; then, the battery is stored for 30 days at a temperature of 60° C.; finally, after the battery is cooled to room temperature, the final thickness of the battery is measured again, and the thickness swelling rate of the battery is calculated; then, the battery is discharged to 3V at a rate of 1 C, and the retention capacity and recovery capacity of the battery are measured. The calculation formula is as follows:

Thickness swelling rate of the battery (%)=(Final thickness−initial thickness)/initial thickness× 100%

Capacity retention rate of the battery (%)=Retained capacity/initial capacity×100%

Capacity recovery rate of the battery (%)=Recovery capacity/initial capacity×100%

2. Embodiments 2-23

In Embodiments 2-23, except for the ingredients and contents thereof of the additives (based on the total weight of the electrolyte) which are subject to table 1, others are the same as Embodiment 1. Table 1 shows contents of ingredients of the electrolyte additives.

TABLE 1

| Embodiment | FEC | Dinitrile compound | 2-methyl maleic anhydride | Other additives |
|---|---|---|---|---|
| Embodiment 1 | 1% | Butanedinitrile: 1% | 0.1% | — |
| Embodiment 2 | 1% | Butanedinitrile: 1%, adiponitrile: 1% | 1% | — |
| Embodiment 3 | 1% | Butanedinitrile: 2%, adiponitrile: 2%, glutaronitrile: 1% | 2% | — |
| Embodiment 4 | 1% | Butanedinitrile: 1%, adiponitrile: 1% | 1% | Lithium bisoxalatoborate: 1% |
| Embodiment 5 | 1% | Butanedinitrile: 1%, adiponitrile: 1% | 1% | 1,3-Propane Sultone: 1% |
| Embodiment 6 | 5% | Butanedinitrile: 1% | 0.1% | — |
| Embodiment 7 | 5% | Butanedinitrile: 1%, adiponitrile: 1% | 0.1% | — |
| Embodiment 8 | 5% | Butanedinitrile: 1%, adiponitrile: 1% | 1% | — |

TABLE 1-continued

| Embodiment | FEC | Dinitrile compound | 2-methyl maleic anhydride | Other additives |
|---|---|---|---|---|
| Embodiment 9 | 5% | Butanedinitrile: 1%, adiponitrile: 1%, glutaronitrile: 1% | 1% | — |
| Embodiment 10 | 5% | Butanedinitrile: 1%, adiponitrile: 1% | 1% | Lithium bisoxalatoborate: 0.2% |
| Embodiment 11 | 5% | Butanedinitrile: 1%, adiponitrile: 1% | 1% | Lithium bisoxalatoborate: 1% |
| Embodiment 12 | 5% | Butanedinitrile: 1%, adiponitrile: 1% | 1% | Lithium bisoxalatoborate: 2% |
| Embodiment 13 | 5% | Butanedinitrile: 1%, adiponitrile: 1% | 1% | 1,3-Propane Sultone: 1% |
| Embodiment 14 | 5% | Butanedinitrile: 1%, adiponitrile: 1%, glutaronitrile: 1% | 2% | — |
| Embodiment 15 | 5% | Butanedinitrile: 2%, adiponitrile: 1% | 1% | — |
| Embodiment 16 | 5% | Butanedinitrile: 2%, adiponitrile: 1% | 1% | Lithium bisoxalatoborate: 1% |
| Embodiment 17 | 5% | Butanedinitrile: 2%, adiponitrile: 2%, glutaronitrile: 1% | 1% | — |
| Embodiment 18 | 5% | Butanedinitrile: 2%, adiponitrile: 2%, glutaronitrile: 1% | 1% | Lithium bisoxalatoborate: 1% |
| Embodiment 19 | 10% | Butanedinitrile: 1% | 0.1% | — |
| Embodiment 20 | 10% | Butanedinitrile: 1%, adiponitrile: 1% | 1% | — |
| Embodiment 21 | 10% | Butanedinitrile: 2%, adiponitrile: 2%, glutaronitrile: 1% | 2% | |
| Embodiment 22 | 10% | Butanedinitrile: 1%, adiponitrile: 1% | 1% | Lithium bisoxalatoborate: 1% |
| Embodiment 23 | 10% | Butanedinitrile: 1%, adiponitrile: 1% | 1% | 1,3-Propane Sultone: 1% |

3. Contrast Examples 1-6

In Contrast Examples 1-6, except for the ingredients and contents thereof of the additives (based on the total weight of the electrolyte) which are subject to table 2, others are the same as Embodiment 1. Table 2 shows contents by weight of ingredients of the electrolyte additives in Contrast Examples 1-6.

TABLE 2

| Contrast Example | FEC | Dinitrile compound | Anhydride |
|---|---|---|---|
| Contrast Example 1 | 5% | — | — |
| Contrast Example 2 | 5% | Butanedinitrile: 1%, adiponitrile: 1% | — |
| Contrast Example 3 | 5% | Butanedinitrile: 1%, adiponitrile: 1% | Butanedioic anhydride: 1% |
| Contrast Example 4 | 5% | Butanedinitrile: 1%, adiponitrile: 1% | Itaconic anhydride: 1% |
| Contrast Example 5 | 5% | Butanedinitrile: 1%, adiponitrile: 1% | Maleic anhydride: 1% |
| Contrast Example 6 | 5% | Butanedinitrile: 1%, adiponitrile: 1% | 2,3-Dimethylmaleic anhydride: 1% |

4. Comparison of Performance of Embodiments 1-23 and Contrast Examples 1-6

Table 3 is Comparison Table of performance of Embodiments 1-23 and Contrast Examples 1-6.

TABLE 3

| | Room temperature cyclic data (500 cycles) | | | High temperature storage data (60° C., 30 days) | | |
|---|---|---|---|---|---|---|
| | Capacity retention rate (%) | Thickness swelling rate (%) | Inner resistance growth rate (%) | Thickness swelling rate (%) | Capacity retention rate (%) | Capacity recovery rate (%) |
| Embodiment 1 | 79.4 | 4.1 | 30.4 | 19.4 | 72.5 | 84.6 |
| Embodiment 2 | 80.4 | 3.5 | 25.6 | 16.8 | 71.4 | 81.9 |
| Embodiment 3 | 78.6 | 3.2 | 28.6 | 16.2 | 74.1 | 85.4 |
| Embodiment 4 | 83.3 | 3.2 | 24.6 | 15.4 | 74 | 85.4 |
| Embodiment 5 | 80.1 | 3.0 | 24.5 | 14.5 | 75.5 | 86.3 |
| Embodiment 6 | 83.2 | 4.7 | 22 | 24.5 | 71.2 | 83.4 |
| Embodiment 7 | 85.5 | 3.3 | 19.5 | 18.9 | 73.4 | 85.7 |
| Embodiment 8 | 85.4 | 6.5 | 21 | 20.3 | 72.8 | 83.2 |
| Embodiment 9 | 85.6 | 4.2 | 20.1 | 18.7 | 73.4 | 85.8 |
| Embodiment 10 | 86.2 | 2.3 | 18.1 | 15.4 | 74.5 | 87.4 |
| Embodiment 11 | 87.5 | 2.3 | 18 | 14.8 | 75.2 | 88.6 |
| Embodiment 12 | 85.8 | 3.1 | 19.8 | 16.7 | 73.4 | 85.4 |
| Embodiment 13 | 86.4 | 4.1 | 19.4 | 13.5 | 78.2 | 88.8 |
| Embodiment 14 | 83.4 | 5.2 | 22.3 | 18.4 | 72.1 | 84.6 |
| Embodiment 15 | 86.7 | 4.5 | 20.5 | 16.3 | 72.5 | 86.3 |
| Embodiment 16 | 80.5 | 4.8 | 25.4 | 19.4 | 70.2 | 83.1 |
| Embodiment 17 | 79.2 | 4.3 | 30.3 | 17.3 | 72.4 | 85.3 |
| Embodiment 18 | 81.4 | 4.0 | 28.2 | 16.5 | 72.8 | 85.7 |
| Embodiment 19 | 88.2 | 8.3 | 19.3 | 30.5 | 74.4 | 80.6 |
| Embodiment 20 | 86.3 | 6.3 | 21.5 | 25.4 | 75.6 | 82.1 |
| Embodiment 21 | 84.6 | 5.9 | 17.3 | 22.8 | 70.2 | 83.4 |
| Embodiment 22 | 86.3 | 6.4 | 15.4 | 18.4 | 74.6 | 84.7 |
| Embodiment 23 | 87.1 | 7.2 | 17.5 | 16.5 | 79.5 | 85.3 |
| Contrast Example 1 | 76.4 | 8.5 | 20.7 | 33.2 | 60.4 | 75.2 |
| Contrast Example 2 | 77.5 | 7.8 | 19.6 | 23.4 | 68.3 | 78.1 |

TABLE 3-continued

| | Room temperature cyclic data (500 cycles) | | | High temperature storage data (60° C., 30 days) | | |
|---|---|---|---|---|---|---|
| | Capacity retention rate (%) | Thickness swelling rate (%) | Inner resistance growth rate (%) | Thickness swelling rate (%) | Capacity retention rate (%) | Capacity recovery rate (%) |
| Contrast Example 3 | 78.3 | 6.3 | 19.3 | 23.2 | 69.1 | 75.7 |
| Contrast Example 4 | 75.2 | 8.5 | 20.4 | 24.6 | 66.1 | 78.3 |
| Contrast Example 5 | 73.6 | 10.2 | 26.7 | 28.5 | 63.7 | 76.4 |
| Contrast Example 6 | 79 | 6.1 | 18.4 | 20.5 | 66.6 | 78.8 |

By comparing with the Contrast Examples 1-6, it is found that, the 2-methyl maleic anhydride used can effectively improve the cycling performance of the battery, obviously enhance the capacity retention rate of the high-voltage lithium cobalt oxide battery after storage at a high temperature, and restrain the thickness swelling; meanwhile, it is also found that, in comparison with the butanedioic anhydride, itaconic anhydride, maleic anhydride and 2,3-dimethylmaleic anhydride, 2-methyl maleic anhydride can better improve the properties of the high-voltage lithium cobalt oxide battery, while the butanedioic anhydride, itaconic anhydride, maleic anhydride and 2,3-dimethylmaleic anhydride have little effect on improvement of the properties of the high-voltage lithium cobalt oxide battery.

5. Embodiments 24-46

In Embodiments 24-46, except for the high-voltage positive active material, lithium cobalt oxide, which is replaced by a high-voltage ternary positive material, $LiNi_{0.5}Co_{0.2}Mn_{0.3}O_2$, in the battery preparation method, and the ingredients and contents (based on the total weight of the electrolyte) of the additives of the electrolyte which are subject to table 4, others are the same as embodiments 1. Table 4 shows contents by weight of ingredients of the electrolyte additives in Embodiments 24-46.

TABLE 4

| Embodiment | FEC | Dinitrile compound | 2-Dimethyl maleic anhydride: | Other additives |
|---|---|---|---|---|
| Embodiment 24 | 1% | Butanedinitrile: 1% | 0.1% | — |
| Embodiment 25 | 1% | Butanedinitrile: 1%, adiponitrile: 1% | 1% | — |
| Embodiment 26 | 1% | Butanedinitrile: 2%, adiponitrile: 2%, glutaronitrile: 1% | 2% | — |
| Embodiment 27 | 1% | Butanedinitrile: 1%, adiponitrile: 1% | 1% | Lithium bisoxalatoborate: 1% |
| Embodiment 28 | 1% | Butanedinitrile: 1%, adiponitrile: 1% | 1% | 1,3-propane sultone: 1% |
| Embodiment 29 | 5% | Butanedinitrile: 1% | 0.1% | — |
| Embodiment 30 | 5% | Butanedinitrile: 1%, adiponitrile: 1% | 0.1% | — |
| Embodiment 31 | 5% | Butanedinitrile: 1%, adiponitrile: 1% | 1% | — |
| Embodiment 32 | 5% | Butanedinitrile: 1%, adiponitrile: 1%, glutaronitrile: 1% | 1% | — |
| Embodiment 33 | 5% | Butanedinitrile: 1%, adiponitrile: 1% | 1% | Lithium bisoxalatoborate: 0.2% |
| Embodiment 34 | 5% | Butanedinitrile: 1%, adiponitrile: 1% | 1% | Lithium bisoxalatoborate: 1% |
| Embodiment 35 | 5% | Butanedinitrile: 1%, adiponitrile: 1% | 1% | Lithium bisoxalatoborate: 2% |
| Embodiment 36 | 5% | Butanedinitrile: 1%, adiponitrile: 1% | 1% | 1,3-propane sultone: 1% |
| Embodiment 37 | 5% | Butanedinitrile: 1%, adiponitrile: 1%, glutaronitrile: 1% | 2% | — |
| Embodiment 38 | 5% | Butanedinitrile: 2%, adiponitrile: 1% | 1% | — |
| Embodiment 39 | 5% | Butanedinitrile: 2%, adiponitrile: 1% | 1% | Lithium bisoxalatoborate: 1% |
| Embodiment 40 | 5% | Butanedinitrile: 2%, adiponitrile: 2%, glutaronitrile: 1% | 1% | — |
| Embodiment 41 | 5% | Butanedinitrile: 2%, adiponitrile: 2%, glutaronitrile: 1% | 1% | Lithium bisoxalatoborate: 1% |
| Embodiment 42 | 10% | Butanedinitrile: 1% | 0.1% | — |
| Embodiment 43 | 10% | Butanedinitrile: 1%, adiponitrile: 1% | 1% | — |
| Embodiment 44 | 10% | Butanedinitrile: 2%, adiponitrile: 2%, glutaronitrile: 1% | 2% | — |
| Embodiment 45 | 10% | Butanedinitrile: 1%, adiponitrile: 1% | 1% | Lithium bisoxalatoborate: 1% |
| Embodiment 46 | 10% | Butanedinitrile: 1%, adiponitrile: 1% | 1% | 1,3-propane sultone: 1% |

6. Contrast Examples 7-12

In Contrast Examples 7-12, except for the high-voltage positive active material, lithium cobalt oxide, which is replaced by a high-voltage ternary positive material, $LiNi_{0.5}Co_{0.2}Mn_{0.3}O_2$, in the battery preparation method, and the ingredients and contents (based on the total weight of the electrolyte) of the additives of the electrolyte which are subject to table 5, others are the same as embodiments 1. Table 5 shows contents by weight of ingredients of the electrolyte additives in Contrast Examples 7-12.

TABLE 5

| Contrast Example | FEC | Dinitrile compound | Anhydride |
|---|---|---|---|
| Contrast Example 7 | 5% | — | — |
| Contrast Example 8 | 5% | Butanedinitrile: 1%, adiponitrile: 1% | — |
| Contrast Example 9 | 5% | Butanedinitrile: 1%, adiponitrile: 1% | Butanedioic anhydride: 1% |
| Contrast Example 10 | 5% | Butanedinitrile: 1%, adiponitrile: 1% | Itaconic anhydride: 1% |
| Contrast Example 11 | 5% | Butanedinitrile: 1%, adiponitrile: 1% | Maleic anhydride: 1% |
| Contrast Example 12 | 5% | Butanedinitrile: 1%, adiponitrile: 1% | 2,3-Dimethylmaleic anhydride: 1% |

7. Properties of Embodiments 24-46 and Contrast Examples 7-12

Table 6 is Comparison Table of performance of Embodiments 24-46 and Contrast Examples 7-12

TABLE 6

| | Room temperature cyclic data (500 cycles) | | | High temperature storage data (60° C., 30 days) | | |
|---|---|---|---|---|---|---|
| | Capacity retention rate (%) | Thickness swelling rate (%) | Inner resistance growth rate (%) | Thickness swelling rate (%) | Capacity retention rate (%) | Capacity recovery rate (%) |
| Embodiment 24 | 82.1 | 6.3 | 25.4 | 27.6 | 59.4 | 70.5 |
| Embodiment 25 | 83.5 | 5.4 | 20.1 | 25.4 | 60.2 | 70.9 |
| Embodiment 26 | 81.7 | 5.2 | 23.7 | 26.7 | 59.8 | 70.7 |
| Embodiment 27 | 84.8 | 6.0 | 20.8 | 24.3 | 62.8 | 72.4 |
| Embodiment 28 | 83.7 | 5.2 | 19.8 | 22.5 | 65.7 | 74.3 |
| Embodiment 29 | 86.3 | 5.7 | 19.8 | 23.8 | 58.7. | 69.4 |
| Embodiment 30 | 88.1 | 5.5 | 19.4 | 23.4 | 61.4 | 72.7 |
| Embodiment 31 | 88 | 5.4 | 20.3 | 24.1 | 61.8 | 73.5 |
| Embodiment 32 | 88.4 | 6.7 | 18.6 | 25.7 | 60.7 | 71.4 |
| Embodiment 33 | 89.2 | 6.4 | 17.8 | 23.4 | 61.2 | 73.1 |
| Embodiment 34 | 90.3 | 5.7 | 15.2 | 20.7 | 63.4 | 75.1 |
| Embodiment 35 | 89.4 | 5.8 | 17.4 | 22.5 | 61.8 | 73.2 |
| Embodiment 36 | 89.7 | 6.3 | 18.2 | 19.5 | 64.8 | 75.4 |
| Embodiment 37 | 86.2 | 6.2 | 21.5 | 21.5 | 61.7 | 72.8 |
| Embodiment 38 | 88.4 | 6.3 | 19.4 | 21.8 | 61.1 | 71.5 |
| Embodiment 39 | 83.5 | 7.3 | 24.8 | 26.7 | 58.4 | 68.3 |
| Embodiment 40 | 81.5 | 8.4 | 27.2 | 23.5 | 60.4 | 70.7 |
| Embodiment 41 | 85.2 | 6.7 | 23.7 | 21.6 | 62.6 | 73.1 |
| Embodiment 42 | 89.6 | 9.1 | 19.7 | 31.6 | 52.8 | 65.8 |
| Embodiment 43 | 87.4 | 7.6 | 21.5 | 26.4 | 56.6 | 67.4 |
| Embodiment 44 | 85.2 | 5.9 | 23.2 | 24.1 | 57.9 | 68.3 |
| Embodiment 45 | 88.1 | 6.7 | 19.7 | 15.6 | 62.5 | 74.3 |
| Embodiment 46 | 87.1 | 7.4 | 20.7 | 14.7 | 63.7 | 74.6 |
| Contrast Example 7 | 79.2 | 10.4 | 22.5 | 35.8 | 48.5 | 62.7 |

TABLE 6-continued

|  | Room temperature cyclic data (500 cycles) | | | High temperature storage data (60° C., 30 days) | | |
| --- | --- | --- | --- | --- | --- | --- |
|  | Capacity retention rate (%) | Thickness swelling rate (%) | Inner resistance growth rate (%) | Thickness swelling rate (%) | Capacity retention rate (%) | Capacity recovery rate (%) |
| Contrast Example 8 | 82.1 | 8.3 | 20.5 | 25.3 | 56.8 | 66.8 |
| Contrast Example 9 | 79.3 | 9.4 | 23.7 | 29.6 | 54.8 | 64.7 |
| Contrast Example 10 | 76.7 | 11.4 | 25.8 | 32.6 | 52.5 | 62.7 |
| Contrast Example 11 | 74.7 | 11.8 | 27.8 | 35.6 | 49.8 | 63.2 |
| Contrast Example 12 | 81.5 | 8.8 | 20.4 | 25.7 | 55.6 | 65.7 |

By comparing with the Contrast Examples 7-12, it is found that, the 2-methyl maleic anhydride used can effectively improve the cycling performance of the ternary high-voltage battery, obviously enhance the capacity retention rate of the ternary high-voltage battery after storage at a high temperature, and restrain the thickness swelling; meanwhile, it is also found that, in comparison with the butanedioic anhydride, itaconic anhydride, maleic anhydride and 2,3-dimethylmaleic anhydride, 2-methyl maleic anhydride can better improve the properties of the ternary high-voltage battery, while the butanedioic anhydride, itaconic anhydride, maleic anhydride and 2,3-dimethylmaleic anhydride have little effect on improvement of the properties of the ternary high-voltage battery.

In conclusion, the additive of the electrolyte of the high-voltage lithium-ion battery provided by the present invention includes 1%-10% of fluoroethylene carbonate, 1%-5% of dinitrile compound and 0.1%-2% of 2-methyl maleic anhydride; and the electrolyte can be further added with additives such as 0.2%-2% of lithium bisoxalatoborate and 1,3-propane sultone, ensuring that the high-voltage battery obtains excellent cycling performance, effectively improving the high-temperature storage performance of the battery, enhancing the capacity retention rate of the battery after storage at a high temperature, and restraining swelling after storage at a high temperature.

What is claimed is:

1. Electrolyte of a high-voltage lithium-ion battery, comprising: a non-aqueous organic solvent, lithium salt and an electrolyte additive, wherein the electrolyte additive a fluoroethylene carbonate in an amount up to 10% of the total weight of the electrolyte, a dinitrile compound in an amount of 1% -5% of the total weight of the electrolyte, a 2-methyl maleic anhydride in an amount of 0.1% -2% of the total weight of the electrolyte, and a lithium bisoxalatoboratein an amount of 0.2% -2% of the total weight of the electrolyte.

2. The electrolyte of the high-voltage lithium-ion battery according to claim 1, characterized by also comprising one or more than two of 1,3-propane sultone, 1,4-butane sultone, 1,3-propylene sultone, ethylene sulfate and propanediol cyclic sulfate.

3. The electrolyte of the high-voltage lithium-ion battery according to claim 1, characterized in that, the dinitrile compound is selected from one or more than two of butanedinitrile, glutaronitrile, adiponitrile, pimelonitrile, suberonitrile, azelanitrile and sebaconitrile.

4. The electrolyte of the high-voltage lithium-ion battery according to claim 1, characterized in that, the non-aqueous organic solvent is selected from one or more than two of ethylene carbonate, propylene carbonate, butylene carbonate, dimethyl carbonate, diethyl carbonate, methyl ethyl carbonate and methyl propyl carbonate.

5. The electrolyte of the high-voltage lithium-ion battery according to claim 1, characterized in that, the non-aqueous organic solvent is a compound of ethylene carbonate, diethyl carbonate and methyl ethyl carbonate.

6. The electrolyte of the high-voltage lithium-ion battery according to claim 1, characterized in that, the lithium salt is selected from one or more than two of lithium hexafluorophosphate, lithium perchlorate, lithium tetrafluoroborate, lithium difluoroborate, bistrifluoromethanesulfonimide lithium salt and imidodisulfuryl fluoride lithium salt.

7. A high-voltage lithium-ion battery, with a charging cut-off voltage being greater than 4.2V and smaller than or equal to 4.5V, comprising a positive electrode, a negative electrode and a membrane between the positive electrode and the negative electrode, characterized by also comprising the electrolyte of the high-voltage lithium-ion battery according to claim 1.

8. The high-voltage lithium-ion battery according to claim 7, characterized in that, the structural formula of the active substances of the positive electrode is: $LiNi_xCo_yMn_z L_{(1-x-y-z)}O_2$, wherein, L is Al, Sr, Mg, Ti, Ca, Zr, Zn, Si or Fe, $0 \leq x \leq 1$, $0 \leq y \leq 1$, $0 \leq z \leq 1$.

9. The high-voltage lithium-ion battery according to claim 7, characterized in that, the material of the positive electrode is $LiCo_xL_{1-x}O_2$, wherein, L is Al, Sr, Mg, Ti, Ca, Zr, Zn, Si or Fe, $0 < x \leq 1$.

* * * * *